United States Patent
Chari et al.

(10) Patent No.: US 7,382,778 B2
(45) Date of Patent: Jun. 3, 2008

(54) LINK LAYER EMULATION

(75) Inventors: Amalavoyal Chari, San Mateo, CA (US); Devabhaktuni Srikrishna, San Mateo, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 658 days.

(21) Appl. No.: 10/751,719

(22) Filed: Jan. 5, 2004

(65) Prior Publication Data

US 2005/0147097 A1    Jul. 7, 2005

(51) Int. Cl.
   *H04L 12/56* (2006.01)
(52) U.S. Cl. .................. 370/392; 370/401; 370/406
(58) Field of Classification Search ............... 370/349, 370/392, 406, 351, 352, 401
   See application file for complete search history.

(56) References Cited

U.S. PATENT DOCUMENTS

| 5,563,881 | A  |   | 10/1996 | Perelman et al. |
| 5,740,366 | A  |   | 4/1998  | Mahany et al. |
| 5,758,282 | A  | * | 5/1998  | Yamashina et al. ......... 455/428 |
| 6,298,053 | B1 |   | 10/2001 | Flammer, III et al. |
| 6,665,725 | B1 | * | 12/2003 | Dietz et al. ................. 709/230 |
| 7,016,328 | B2 | * | 3/2006  | Chari et al. ................. 370/331 |
| 2005/0135422 | A1 | * | 6/2005 | Yeh ............................. 370/474 |

* cited by examiner

*Primary Examiner*—CongVan Tran
(74) *Attorney, Agent, or Firm*—Brian R. Short (57) ABSTRACT

An embodiment includes a network of at least one router. The network includes a data packet address translator. The data packet address translator manipulates address information of data packets routed by the network, so that a network device connected to the network perceives the network to be a bridge. One embodiment of the network includes wireless mesh network that is wirelessly connectable to a client.

14 Claims, 10 Drawing Sheets

LINK LAYER EMULATION

FIELD OF THE INVENTION

The invention relates generally to communication networks. More particularly, the invention relates to communication link layer emulation.

BACKGROUND OF THE INVENTION

Packet networking is a form of data communication in which data packets are routed from a source device to a destination device. Packets can be networked directly between a source node and a destination node, or the packets can be relayed through a number of intermediate nodes. The packets generally include a source address, a destination address and a payload.

Figure 1:
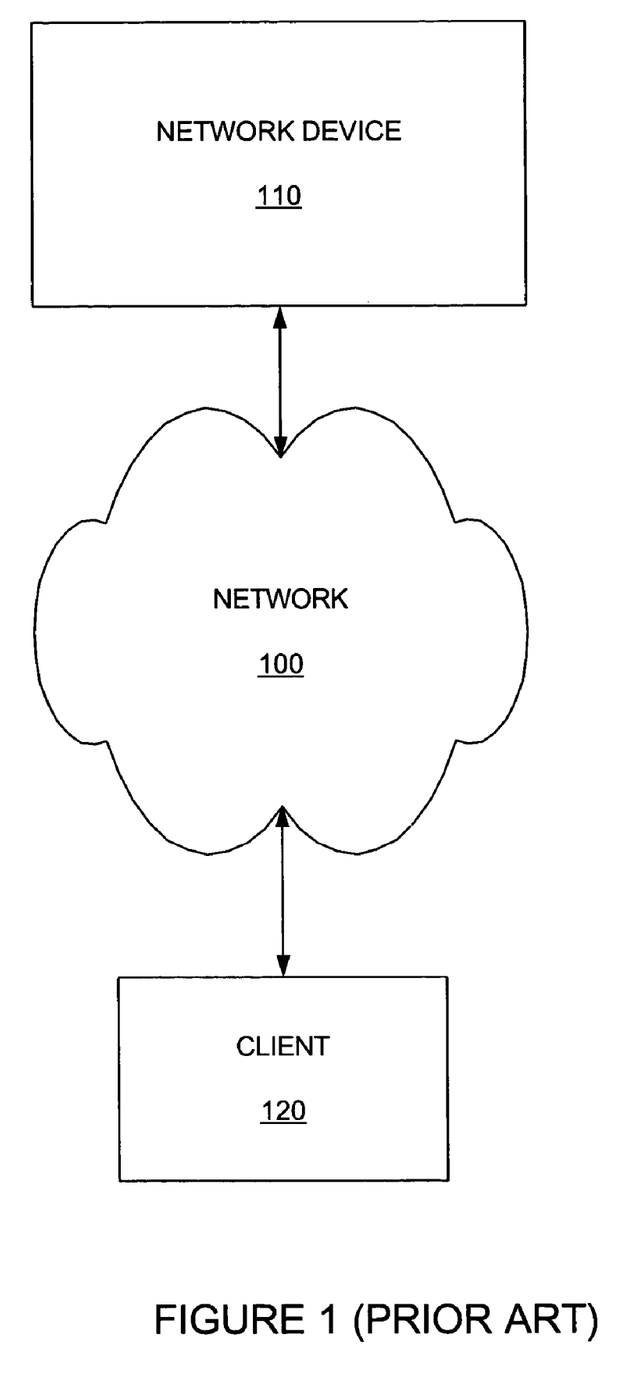
FIG. 1 shows a network device connected to a client through a network.

FIG. 1 shows a network device 110 connected to a network 100. A client device 120 can also be connected to the network 100. For some networks, the network device 110 is a layer two (OSI model) device and the network 100 includes layer two routers. With the network 100 including only layer two devices, the network 100 appears to the network device 110 to be a transparent bridge. That is, if the network only includes layer two devices, then any client 120 connected to the network 100, appears to the network device 110, to be directly connected to the network device 110.

In some situations, it may be desirable to implement a network with layer three devices. Generally, a layer two device and layer two networks transparently bridge data packets without altering MAC or IP header fields of the data packets, whereas layer three devices generally alter MAC header fields of data packets passing through the layer three devices. The altering of MAC headers of data packets can present problems when interfacing a layer two device with a layer three network.

It is desirable to have a layer three network that allows a network device connected to the network to perceive the network as a transparent bridge. The network device should perceive a client connected to the network, to be connected directly to the network device.

SUMMARY OF THE INVENTION

The invention includes an apparatus and method for emulating a layer two network. An embodiment of the invention includes a network of at least one router. The network includes a data packet address translator. The data packet address translator manipulates address information of data packets routed by the network, so that a network device connected to the network perceives the network to be a bridge. One embodiment of the network includes wireless mesh network that is wirelessly connectable to a client.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in link layer emulation. More specifically, the invention can include emulating a layer two network, so that a network device connected to a layer three network, perceives that layer three network as a transparent bridge.

Figure 2:
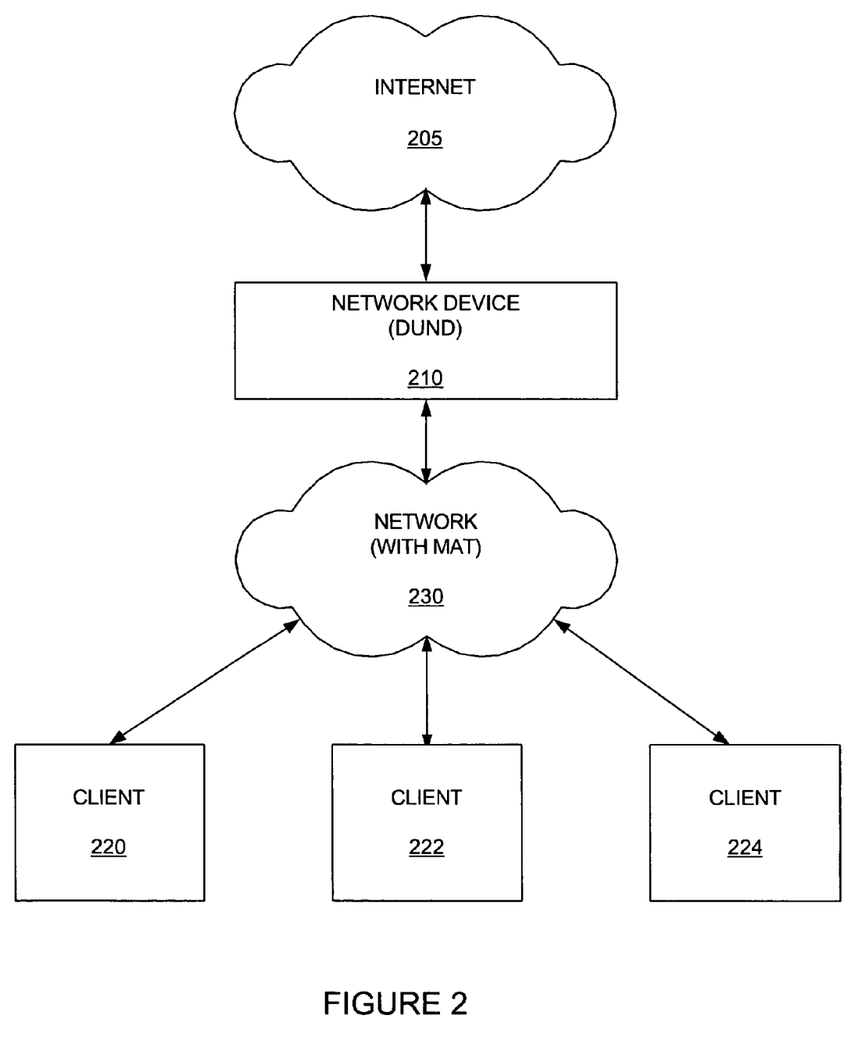
FIG. 2 shows network device connected to clients through a network of routers, according to an embodiment of the invention.

FIG. 2 shows one example of a network device 210 connected to clients 220, 222, 224 through a network 230 of routers. The network 230 includes a MAC (media access control) address translator (MAT). The MAT of the network 230 provides manipulation of data packet addresses so that layer three routers of the network appear to the network device to be layer two devices. As a result, the network 230 appears to the network device 210 to be a transparent bridge. Additionally, the clients 220, 222, 224 appear to the network device 210 to be directly connected to the network device 210. One embodiment of a layer 2 network is a transparent bridge.

The clients 220, 222, 224 can consist of a laptop computer, a personal digital assistant (PDA), a cell-phone, or any other device that includes an interface card adaptable for use with the networks of the invention.

The network device 210 can include any directly-upstream networking device (DUND). Exemplary DUNDs include routers, authentication gateways and switches. Generally, the network device 210 provides the client access to an internet or intranet network. The internet is a global network connecting millions of computers, in which control of the network is decentralized. Generally, each internet computer is independent, and referred to as a host. The intranet is generally a network belonging to an organization that is only accessible by authorized members of the organization. Generally, the intranet includes a firewall that surrounds the intranet to fend off unauthorized users.

Generally, client devices communicate with hosts on the internet or intranet. An upsteam direction can be defined to be the direction away from a client device, whereas a downstream direction can be defined to be the direction towards a client device. A network device that is upstream of the network is defined as an upstream device. A network device that is downstream of the network is defined as a downstream device.

One example of a DUND is an authentication gateway. The authentication gateway provides authentication, authorization and accounting of client devices. Before a client can gain access to network resources provided by the DUND, the client must be authenticated by the authentication gateway. Many authentication protocols exist, including Radius, Diameter, etc.

Generally, the authentication gateway identifies the client devices based on the IP address of the client, or the MAC address of the client. Authentication based on the MAC address of a client can be problematic when interfacing a layer two DUND with a layer three network because the MAC address information of a client is not preserved when data packets of the client are routed through a layer three network.

The network 230 can be as simple as a single router, or the network 230 can include a mesh network that includes many routers. One example of a mesh network includes a wireless mesh network that can be wirelessly or wired connected to the clients 220, 222, 224. The wireless mesh network can include routers in the form of wireless access nodes. The wireless access nodes can provide wireless connectivity between access nodes, and to mobile clients.

Figure 3:
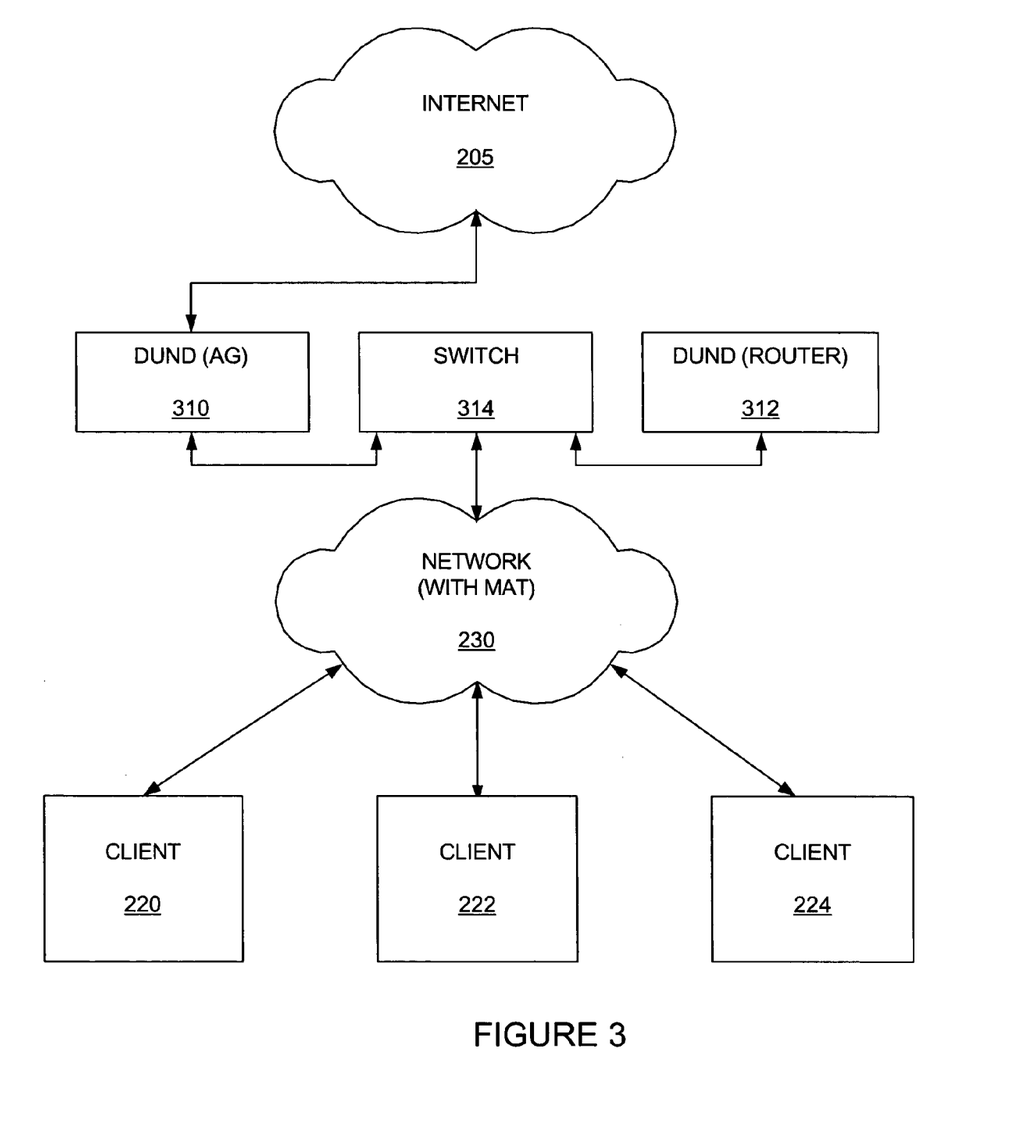
FIG. 3 shows network devices connected to clients through a network of routers, according to another embodiment of the invention.

FIG. 3 shows one example of a first DUND 310 and a second DUND 312 that can be connected to the clients 220, 222, 224 through the network 230 of routers. A layer two switch 314 provides selectable connectivity between the DUNEs and the network 230. As shown in FIG. 3, the first DUND 310 can be an authentication gateway, and the second DUND 312 can be a router.

Figure 4:
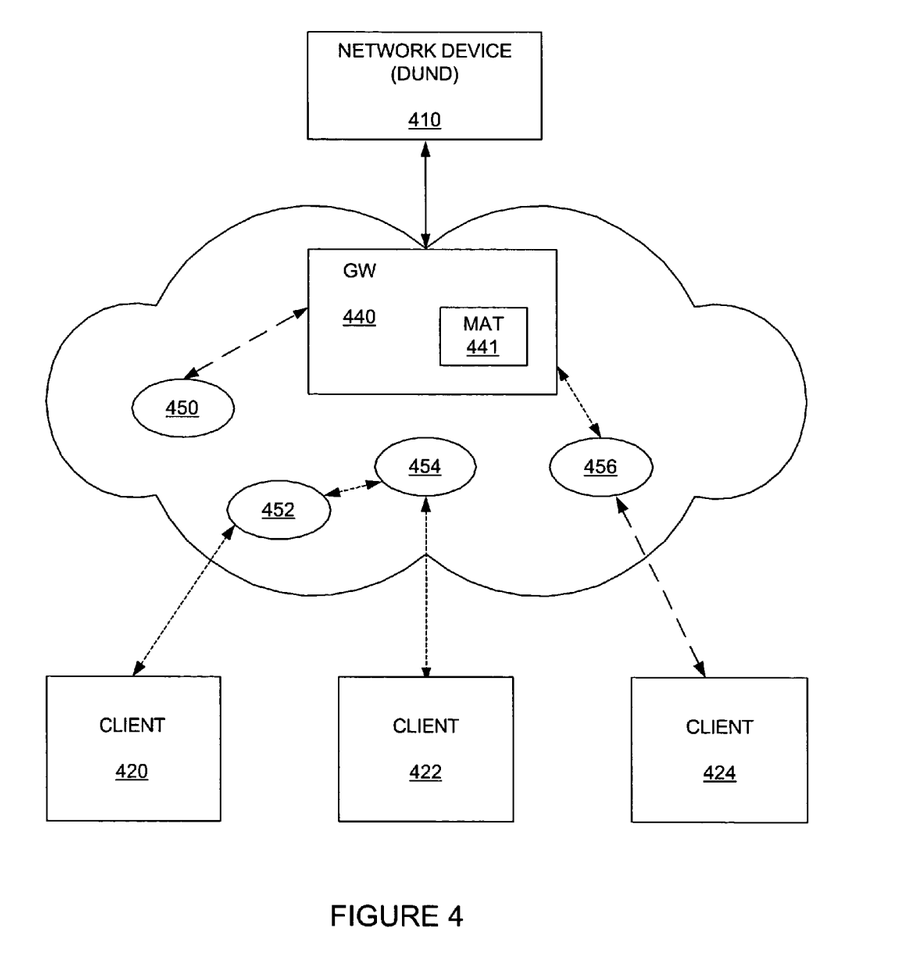
FIG. 4 is shows a network that includes a gateway and access nodes, according to an embodiment of the invention.

FIG. 4 shows another example of a network device 410 connected to clients 420, 422, 424 through a network 430 of routers. The network 430 of FIG. 4 includes a gateway 440 and a number of wireless access nodes 450, 452, 454, 456. The wireless access nodes of FIG. 4 operate as routers that are accessible by the clients 420, 422, 424 as shown, as well as other clients not shown.

A gateway is a network entity that maintains an address mapping table for each client. As will be described, the address mapping table generally includes a MAC-IP address mapping for the client devices. A gateway can service several access nodes, or a gateway can be an access node. In this case, the gateway generally includes one or many more downlink interfaces. An embodiment includes the gateway being an edge router between wired and wireless networks. An access node is a router that is directly connected (or connected through a layer two network) to one or more client devices.

The gateway 440 includes a MAC address translator (MAT) 441. The MAT 441 provides manipulation of the MAC addresses of data packets being routed by the network 430. Link layer emulation by the gateway 440 (as provided by the MAT) provides that each packet sourced from a client device 420, 422, 424 and routed through the network 430 is received by the network device 410 with a MAC address that is the client devices MAC address. That is, the packet is received by the network device 410 with the client MAC address as the source MAC address, as happens when the network 430 includes layer two devices rather than layer three devices, or if one of the client devices 420, 422, 424 is directly connected to the network device 410. Additionally, the network device 410 can use the actual destination MAC address of the receiving client device 420, 422, 424 when sending packets to the client device 420, 422, 424. The packets are received by the gateway 440 and forwarded through the layer three network to the correct client device 420, 422, 424. If the network device 410 issues an ARP (address resolution protocol) request to resolve a MAC address corresponding to the IP address of a client device, the gateway 440 responds on behalf of the client device with the correct MAC address of the client device.

Address Resolution Protocol (ARP)

The ARP protocol is a method for mapping an IP address to a corresponding MAC address. When a network device, such as a router receives a packet in which the destination IP address is not that of a local interface, the network device makes a forwarding decision. In the event that a direct route exists in the router's (network device) route table (indicating that the destination IP address is directly attached to the router through one of its ports), the router attempts to forward the packet out over the interface on which the destination IP address is accessible (the downstream interface). Before transmitting the packet, however, the router creates and populates a MAC header for the packet. In order to do so, the router needs to know the destination MAC address corresponding to the destination IP address. Generally, the router first consults a local ARP table that contains a mapping of IP addresses to MAC addresses. If a matching entry is found, the router populates the destination MAC address field of the packet with the value obtained from the ARP table. In the event that no entry is found corresponding to the destination IP address, the router issues a broadcast ARP request on the downstream interface for the destination IP address. The device whose IP address is this destination IP address responds to the ARP request, providing device MAC address. With this information, the router is able to populate the MAC header field and forward the queued packet to the destination IP address. Information from the ARP response is used to construct an ARP table entry for the device Mac and IP address combination.

Pseudo Proxy ARP

The DUND issues ARP requests for client devices. In this case, it is important for the gateway to respond on behalf of the client device with the correct MAC address of the client device. The client device cannot itself respond to the ARP request because the ARP requests are broadcast, and broadcasts are not forwarded by a layer three network. In order for the gateway to respond with an ARP response containing the correct MAC address, the gateway needs to have a locally-maintained mapping of IP-MAC address for each client device. This is achieved through the operation of an AARP (Anti-ARP) protocol. The gateway consults an AARP database, determines the MAC address corresponding to the queried IP address and replies to the DUND with the correct MAC address. In order to achieve consistency, the source MAC address of the ARP response is set to the MAC address of the client device whose MAC address is being sought. This is important because certain DUNDs, do not update their ARP table when they receives an ARP response in which the source MAC address does not match the address in the body of the ARP frame. This process is performed by the gateway, and is referred to as a pseudo proxy ARP proxy (PPA) to distinguish this method from proxy ARP (in which the gateway responds to the ARP request with its own MAC address).

In one embodiment, a software process listens on an open IP socket for ARP requests. When a request is received for an IP address that is identified as belonging in the local AARP database (thereby identifying a client device), the process constructs an ARP response with source MAC address set to the MAC address of the client device, and the MAC address of the ARP response is set to the MAC address of the client device. This ARP response packet is transmitted on the same network interface on which it was received.

The DUND is able to associate the correct MAC address to the IP address of the client device, as would happen if the network between the client device and the DUND had been a layer two network (in which broadcasts, such as ARP requests, are rebroadcast). This is one of the features of the link layer emulation mode.

Anti-ARP Protocol (AARP)

One or more gateways on the network can maintain a MAC-address-to-IP-address mapping for all client devices attached to the network. The address mapping can be stored in an address mapping table that can be arranged to be synchronized across all the gateways. This address mapping table can be referred to as an AARP Table (AARP=Anti-ARP). ARP is generally is a protocol for the resolution of IP addresses to MAC addresses. Here, anti-ARP (AARP) is a protocol for the resolution of MAC addresses to IP addresses. The AARP protocol is based on a client-server architecture in which the AARP server on the gateway can be queried to extract the IP address corresponding to a given MAC address.

Generally, the network architecture includes a distributed network of AARP servers that may query each other and synchronize their address mapping tables periodically or on-demand in order to satisfy AARP queries.

Figure 5:
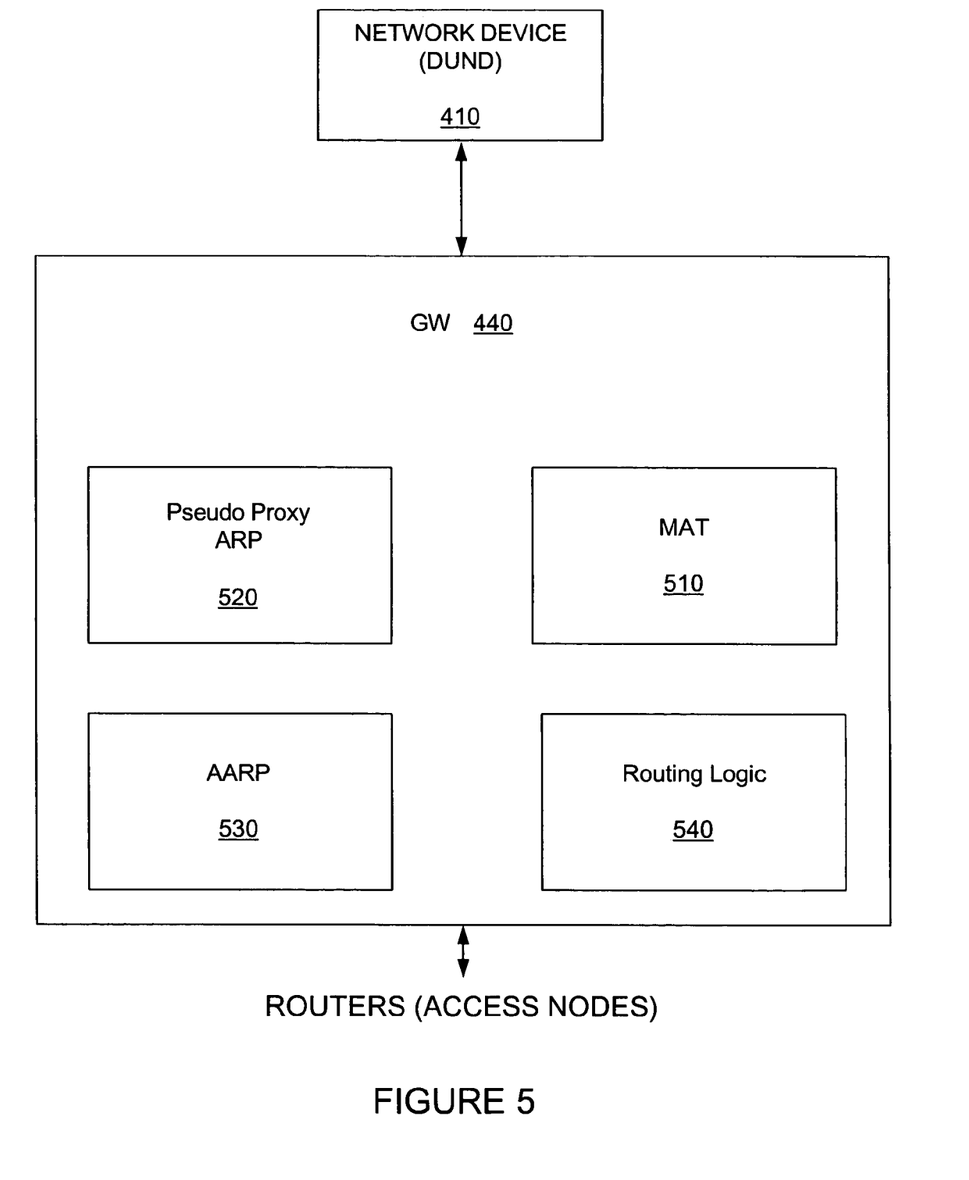
FIG. 5 shows one example of a gateway according to an embodiment of the invention.

FIG. 5 shows one example of a gateway 440 with greater detail. The gateway 440 includes a MAT 510, a pseudo proxy ARP controller 520, an AARP controller 530, and routing logic 540.

The MAT 510 provides the MAC address manipulation required for the layer three network to appear as a layer two network to the DUND. More precisely, the MAT 510 modifies data packet MAC addresses to a client MAC address corresponding to an IP address of the data packets being routed by the network of the gateway 440.

The pseudo proxy ARP controller 520 provides a gateway response on behalf of a client device with the correct MAC address of the client device. In order for the gateway to respond with an ARP response containing the correct MAC address, the gateway needs to have a locally-maintained mapping of IP-MAC address for each client device. This is achieved through the operation of the AARP (Anti-ARP) protocol. The gateway consults an AARP database, determines the MAC address corresponding to the queried IP address and replies to the DUND with the correct MAC address. In order to achieve consistency, the source MAC address of the ARP response is set to the MAC address of the client device whose MAC address is being sought.

The AARP controller 530 maintains a MAC-address-to-IP-address mapping for all client devices attached to the network. The address mapping can be stored in an address mapping table that can be arranged to be synchronized across all the gateways. The AARP is a protocol for the resolution of MAC addresses to IP addresses. The AARP protocol is based on a client-server architecture in which the AARP server on the gateway can be queried to extract the IP address corresponding to a given MAC address.

The routing logic 540 of the gateway provides the routing paths of data packets through the network, between the DUND and client devices. For a wireless access node mesh network, the route selection can be dynamic, and include several wireless hops between access nodes of the wireless mesh network. Generally, the creation, management, maintenance and deletion of routes is accomplished through the operation of a routing protocol MAC Address Translation (Upstream Traffic)

A packet originating at a client device is forwarded through the layer three network using IP forwarding. Typically management of routing tables occurs through the operation of protocols such as RIP or OSPF.

When the packet reaches the gateway, it is to be forwarded upstream to the DUND. Once the forwarding decision has been made, a MAC header should be constructed for the outgoing packet (now on a queue). The destination MAC address is set to be the MAC address of the DUND, which is obtained either from the local ARP table or through the ARP request-response mechanism. The source MAC address would be, by default, be set to the MAC address of the outgoing interface on the gateway. This, however, is incorrect in link layer emulation mode. If the packet is sent with the MAC address of the gateway, the DUND receiving the packet would update its ARP table, now associating the IP address of the client device with the MAC address of the gateway. This is not desired, and would result in service interruptions to the client device. Therefore the gateway should set the source MAC address to the MAC address of the client device. The gateway does this so (1) consulting an AARP database and extracting the MAC address corresponding to the IP address in the source IP address field of the packet, (2) setting this MAC address as the source MAC address of the packet. The modified packet is now transmitted on the outgoing interface.

The net result of this manipulation of the packet is that the packet received by the DUND has source MAC address set to the MAC address of the client device and source IP address set to the IP address of the client device—exactly as if the client device had been directly attached to the DUND, or attached to the DUND through an intervening transparent layer two network. In one embodiment, a list of packet filtering rules is set up on the gateway to inspect each packet appearing on an incoming interface, detecting a match of the source IP address field with that of any of the IP addresses in the list, and modifying the forwarded (outgoing) packet so that the source MAC address field on the packet is altered to a MAC address specified by the list. The list of packet filtering rules in question is administered and set up by the AARP process. MAC address translation (downstream traffic).

Figure 6:
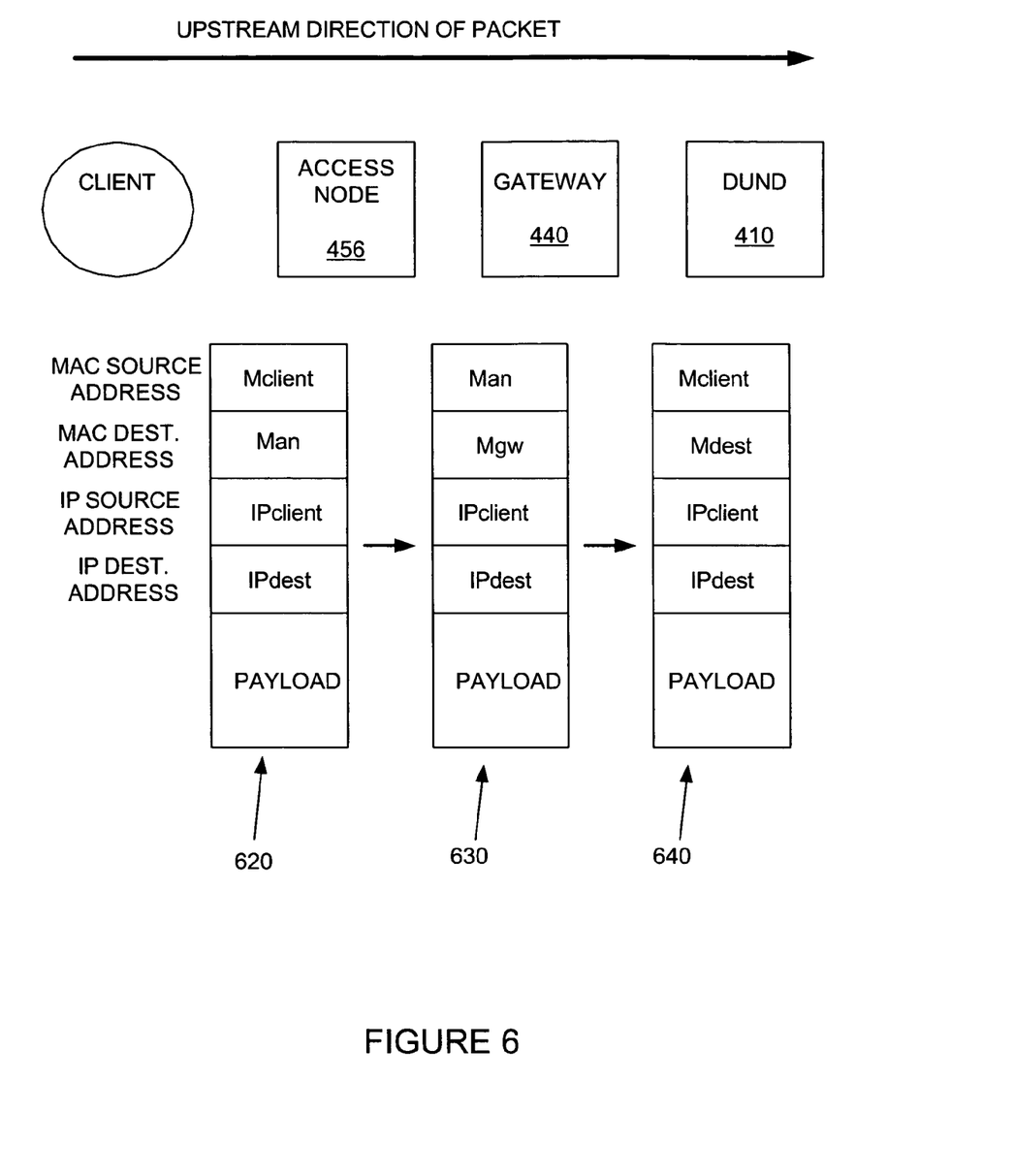
FIG. 6 an upstream data path.

FIG. 6 shows an upstream data path for a data packet. For an upstream data path, the data packet originates at a client device, and is destined for a DUND 410. The data packet includes MAC source address and MAC destination address within a MAC header, IP source address and EP destination address within an IP header, and a payload. As the data packet travels from the client device, through an access node (for example AN 456), through a gateway (for example, gateway 440), to the DUND 410, the MAC addresses are manipulated by the network.

An originating data packet 620 includes a MAC source address that is the client's MAC address (Mclient), a MAC destination address that is the access node's MAC address (Man), an IP source address that is the client's IP address (IPclient), an IP destination address that is the destination's (DUND) IP address (IPdest), and a payload.

Upon being received by the access node 456, the MAC source address is modified to the access node's MAC address (Man), and the MAC destination address is modified to the gateway's MAC address (Mgw). This packet configuration is shown as packet 630.

Upon being received by the gateway 440, the MAC source address is modified to the client's MAC address (Mclient), and the MAC destination address is modified to the DUND's MAC address (Mdest). This packet configuration is shown as packet 640. Observation of the packet 640, reveals that the packet 640 appears to the DUND 410 to have been received directly from the client device.

MAC Address Translation (Downstream Traffic)

When a DUND receives a packet for forwarding, it makes a forwarding decision and then constructs a MAC header using either its internal ARP table or through the ARP protocol. The resultant packet, if addressed to a client device, will have a destination MAC address that of the client device (this is ensured by virtue of the PPA mechanism discussed previously). This packet is received on the upstream interface of the gateway.

If a packet is received by a layer three device with destination MAC address not that of the layer three device or a broadcast or multicast address, the layer three device drops or discards the packet. In contrast, in one embodiment of the link layer emulation mode, the packet received by the gateway is first inspected to determine if the destination MAC address matches any of (1) the MAC address of the gateway, (2) the MAC address of a known client device. If a match is detected, the received packet is accepted for further processing. If the received packet has source MAC and IP addresses that match those of a client device (as determined from the AARP database), the packet is dispatched to the forwarding layer for a forwarding/routing decision. In another embodiment of link layer emulation mode, the received packet is intercepted by a packet filtering process that modifies the destination MAC address to the MAC address of the gateway. This has the effect that the drop/discard decision is never made and the packet always proceeds to the forwarding decision stage.

Figure 7:
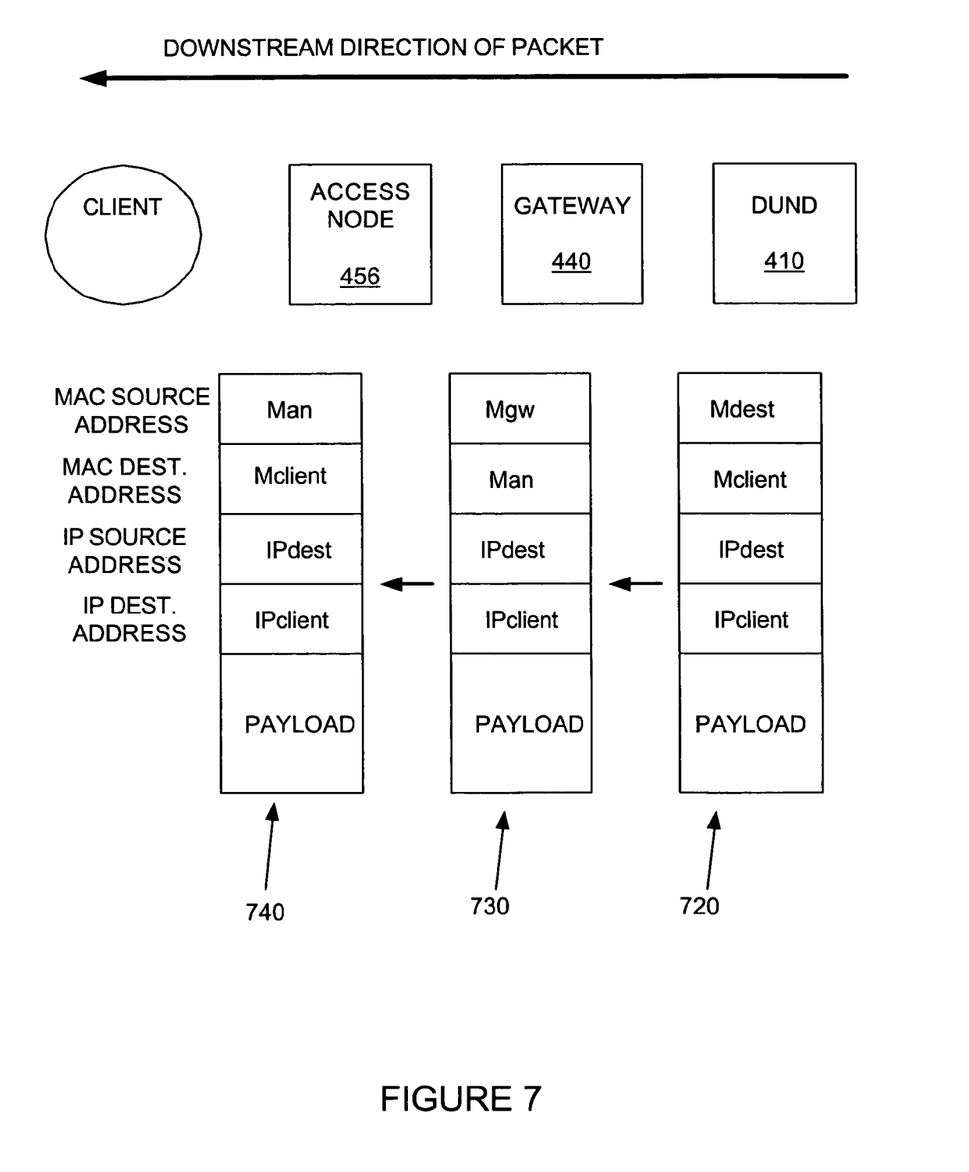
FIG. 7 shows a downstream data path.

FIG. 7 shows a downstream data path for a packet. For a downstream data path, the packet originates at the DUND 440, and is destined for a client. The data packet includes MAC source address and MAC destination address within a MAC header, IP source address and IP destination address within an IP header, and a payload. As the data packet travels from the DUND 410, through a gateway (for example, gateway 440), through an access node (for example AN 456), to the client device, the MAC addresses are manipulated by the network.

An originating data packet 720 includes a MAC source address that is the DUND's MAC address (Mdest), a MAC destination address that is the client's MAC address (Mclient), an IP source address that is the DUND's IP address (IPdest), an IP destination address that is the client's IP address (IPclient), and a payload.

Upon being received by the gateway 440, the MAC source address is modified to the gateways's MAC address (Mgw), and the MAC destination address is modified to the access nodes's MAC address (Man). This packet configuration is shown as packet 730. Observation of the packet 730, reveals that the packet 730 has been modified by the gateway so that the data packet will make it to the client without the DUND 440 being aware that the packet is passing through the network.

Upon being received by the access node 456, the MAC source address is modified to the access node's MAC address (Man), and the MAC destination address is modified to the client's MAC address (Mclient). This packet configuration is shown as packet 740.

Figure 8:
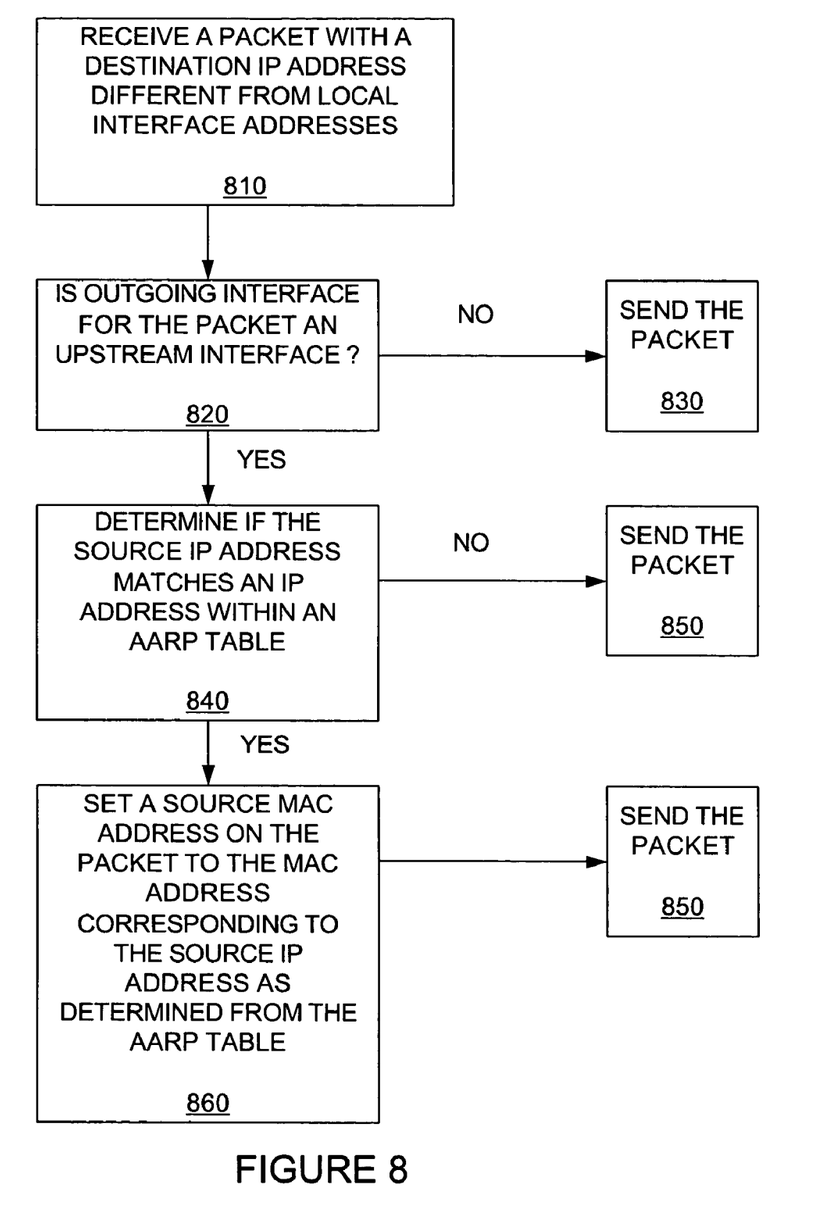
FIG. 8 shows one example of a sequence of events for manipulating a MAC address of a downstream data packet.

FIG. 8 is a flow chart showing steps included within one example of a method of MAC address translation (MAT) for a downstream data packet. A first step 810 includes receiving a packet with a destination IP address different from local interface addresses. A second step 820 includes making a decision. If the outgoing interface for the packet is not an upstream interface, a third step 830 is executed that includes sending the packet. If the outgoing interface for the packet is an upstream interface, a fourth step 840 is executed that includes determining if the source IP address matches an IP address within an AARP table. If there is not a match, a fifth step 850 is executed that includes sending the packet. If there is a match, a sixth step 860 is executed that includes setting a source MAC address on the packet to the MAC address corresponding to the source IP address as determined from the AARP table. A seventh step 870 includes sending the packet.

Figure 9:
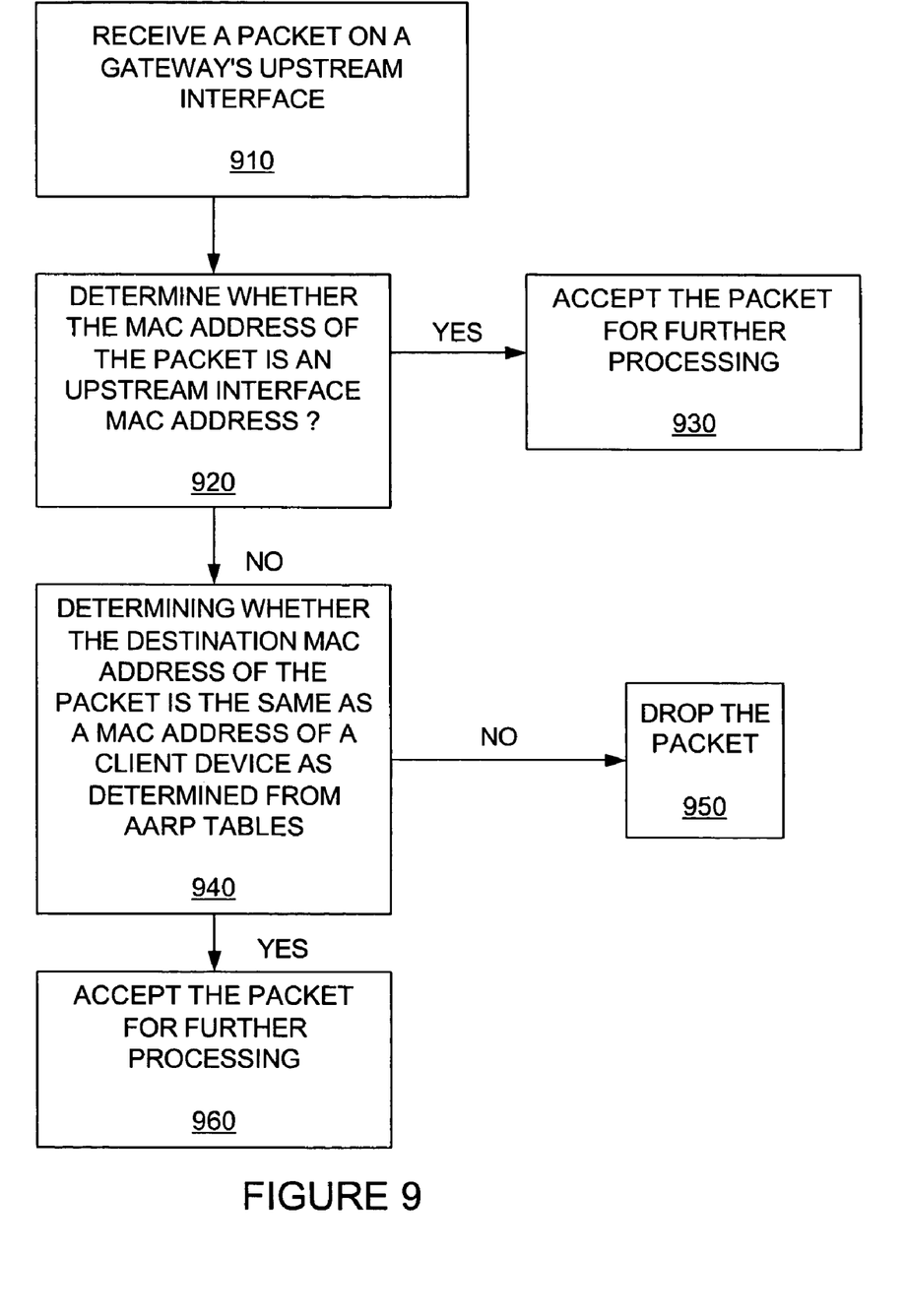
FIG. 9 shows one example of a sequence of events for manipulating a MAC address of an upstream data packet.

FIG. 9 is a flow chart showing steps included within one example of a method of MAC address translation (MAT) for an upstream data packet. A first step 910 includes receiving a packet on a gateway's upstream interface. A second step 920 includes determining whether the MAC address of the packet is an upstream interface MAC address. If the MAC address is an upstream interface MAC address, then a third step 930 is executed that includes accepting the packet for further processing. If the MAC address is not an upstream interface MAC address, then a fourth step 940 is executed that includes determining whether the destination MAC address of the packet is the same as a MAC address of a client device as determined from AARP tables. If the MAC address is not the same, then a fifth step 950 is executed that includes dropping the packet. If the MAC address is the same, then a sixth step 960 is executed that includes accepting the packet for further processing.

Figure 10:
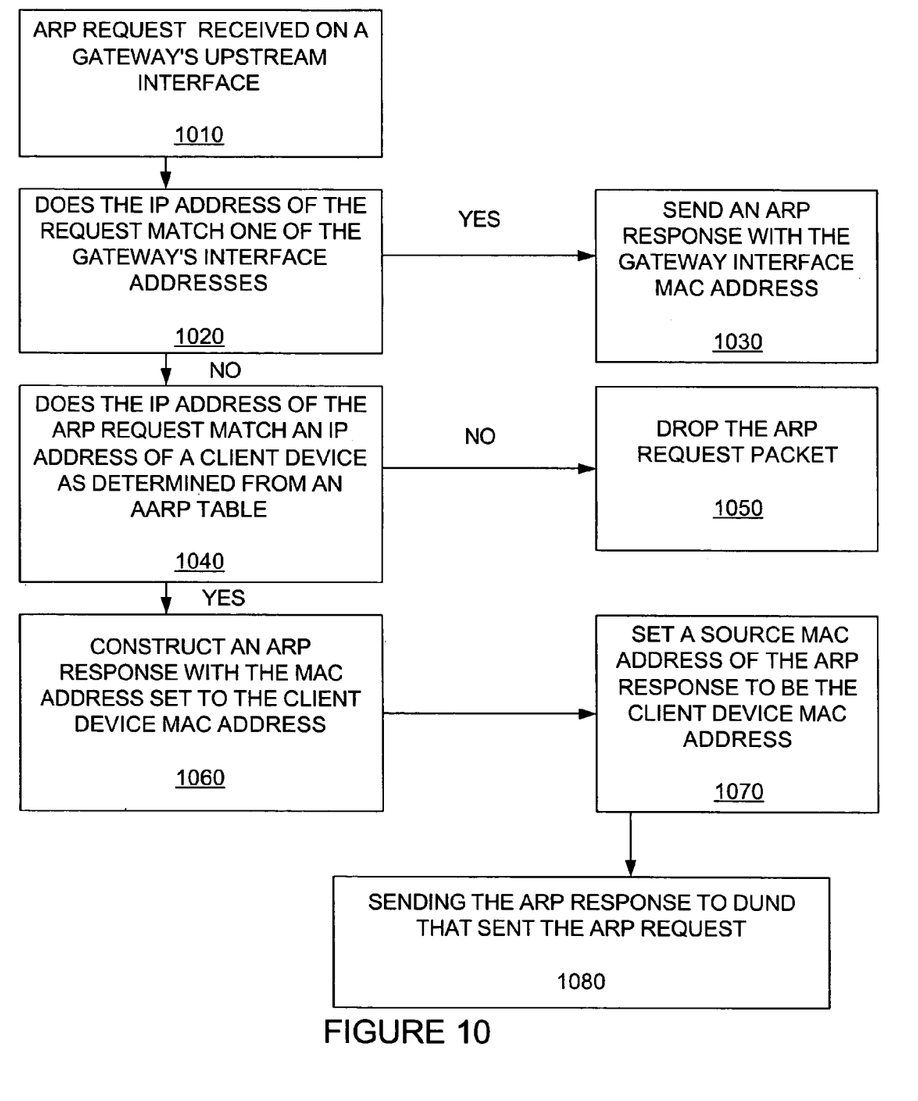
FIG. 10 shows one example of a sequence of events for executing a pseudo proxy ARP.

FIG. 10 is a flow chart showing steps included within one example of a method of executing a pseudo proxy ARP. A first step 1010 includes an ARP request being received on a gateway's upstream interface. A second step 1020 includes determining whether the IP address of the request matches one of the gateway's interface addresses. If the request does match, then a third step 1030 is executed that includes sending an ARP response with the gateway interface MAC address if the request doesn't match, then a fourth step 1040 is executed that includes determining whether the IP address of the ARP request matches an IP address of a client device as determined from an AARP table. If the request doesn't match, then a fifth step 1050 is executed including dropping the ARP request packet. If the request does match, then a sixth step 1060 is executed including constructing an ARP response with the MAC address set to the client device MAC address. A seventh step 1070 includes setting a source MAC address of the ARP response to be the client device MAC address. An eighth step 1080 includes sending at the ARP response to DUND that sent the ARP request.

Although specific embodiments of the invention have been described and illustrated, the invention is not to be limited to the specific forms or arrangements of parts so described and illustrated. The invention is limited only by the appended claims.

What is claimed is:

1. A method of connecting a layer 2 network device with a client through a wireless network, the wireless network comprising at least one layer 3 router, the method comprising:

at least one layer 3 router of the wireless network receiving data packets, wherein the wireless network receiving data packets comprises:
a first layer 3 access node receiving data packets from a client through a wireless link;
a layer 3 gateway receiving the data packets from at least one of the first layer 3 access node and another layer 3 access node through another wireless link;
the at least one layer 3 router of the wireless network modifying MAC addresses of the data packets so that the layer 2 network device perceives the wireless network as a layer 2 network, comprising;
the layer 3 access node modifying MAC source addresses of the data packets from a MAC address of the client to a MAC address of the layer 3 access node;

the layer 3 gateway modifying the MAC source addresses of the data packets from a MAC address of at least one of the first layer 3 access node and another layer 3 access node to a MAC address of the client.

2. The method of claim 1, further comprising:
the wireless network responding to an ARP of the layer 2 network device with the MAC address of the client.

3. The method of claim 2, wherein the response is generated by referencing a maintained map of IP and MAC addresses of each client.

4. The method of claim 3, wherein a source MAC address of the ARP response is a MAC address of a gateway of the wireless network.

5. The method of claim 3, wherein the maintained map is a locally maintained anti-ARP database.

6. The method of claim 1, wherein for an upstream data packet, the wireless network sets a source MAC address of the data packet to a client MAC address.

7. The method of claim 6, wherein setting a source MAC address comprises:
consulting an AARP database; and
extracting a client MAC address that corresponds with the source IP address of the data packets.

8. The method of claim 6, further including:
a gateway inspecting each data packet, detecting a match of a packet IP address with an IP address within a filtering list; and
modifying matched packets before forwarding with a corresponding MAC address as specified by the filtering list.

9. The method of claim 1, wherein for a downstream data packet, a gateway inspects the data packets to determine if a MAC address of any data packet matches a MAC address of the gateway, or a MAC address of a known client device.

10. The method of claim 1, further comprising the layer 3 gateway obtaining the MAC address of the client, comprising:
consulting an AARP database, determining the MAC address corresponding to a queried IP address.

11. The method of claim 10, wherein the wireless network comprises a distributed network of AARP servers that may query each other and synchronize there address maps to satisfy AARP queries.

12. The method of claim 10, wherein AARP database comprises an address mapping table that is synchronized across multiple gateways of a wireless mesh network.

13. The method of claim 1, further comprising:
a layer 3 gateway of the network receiving an ARP request on an upstream interface of the layer 3 gateway;
the layer 3 gateway determining whether an IP address in which resolution is being requested by the ARP request matches an interface address of the layer 3 gateway;
if the request does match the interface address, then the layer 3 gateway sending an ARP response with the gateway interface MAC address;
if the request doesn't match the interface address, then determining whether the IP address of the ARP request matches an IP address of a client as determined from an AARP table;
if the request doesn't match at least one of the interface address and the IP address, then dropping the ARP request packet;
if the request does match at least one of the interface address and the IP address, then the layer 3 gateway constructing an ARP response with the MAC address set to the client MAC address;
setting a source MAC address of the ARP response to be the client MAC address.

14. A method of connecting a layer 2 network device with a client through a wireless network, the wireless network comprising at least one layer 3 router, the method comprising:
the wireless network receiving data packets;
the wireless network modifying MAC addresses of the data packets so that the layer 2 network device perceives the wireless network as a layer 2 network;
the wireless network responding to an ARP of the layer 2 network device with the MAC address of the client by referencing a maintained map of IP and MAC addresses of each client device, wherein a source MAC address of the ARP response is a MAC address of a gateway of the wireless network;
a layer 3 gateway of the network receiving an ARP request on an upstream interface of the layer 3 gateway;
the layer 3 gateway determining whether an IP address in which resolution is being requested by the ARP request matches an interface address of the layer 3 gateway;
if the request does match the interface address, then the layer 3 gateway sending an ARP response with the gateway interface MAC address;
if the request doesn't match the interface address, then determining whether the IP address of the ARP request matches an IP address of a client device as determined from an AARP table;
if the request doesn't match at least one of the interface address and the IP address, then dropping the ARP request packet;
if the request does match at least one of the interface address and the IP address, then the layer 3 gateway constructing an ARP response with the MAC address set to the client device MAC address;
setting a source MAC address of the ARP response to be the client device MAC address.

* * * * *